O. H. UVAAS.
RIM CONTRACTOR AND EXPANDER.
APPLICATION FILED JAN. 12, 1918.

1,379,426.

Patented May 24, 1921.
2 SHEETS—SHEET 1.

Witnesses
H. L. Opsahl
E. C. Wells

Inventor
Oscar H. Uvaas
By his Attorneys
Williamson & Merchant

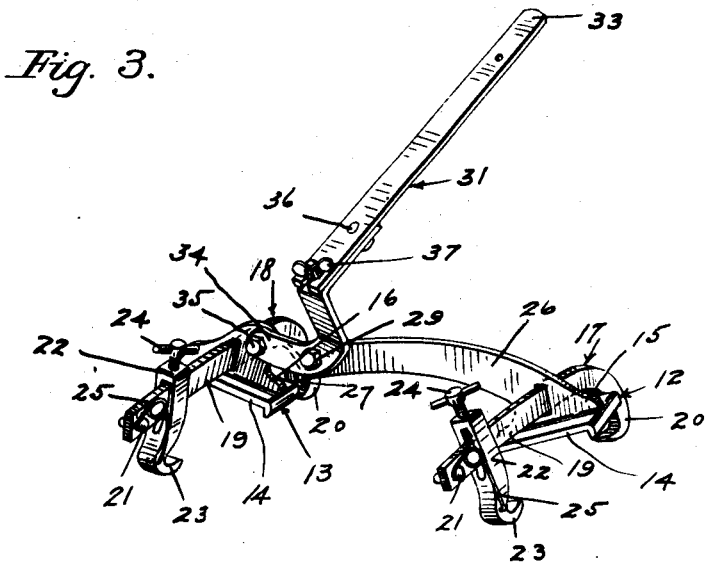

UNITED STATES PATENT OFFICE.

OSCAR H. UVAAS, OF KENSINGTON, MINNESOTA.

RIM CONTRACTOR AND EXPANDER.

1,379,426.   Specification of Letters Patent.   Patented May 24, 1921.

Application filed January 12, 1918. Serial No. 211,644.

*To all whom it may concern:*

Be it known that I, OSCAR H. UVAAS, a citizen of the United States, residing at Kensington, in the county of Douglas and State of Minnesota, have invented certain new and useful Improvements in Rim Contractors and Expanders; and I do hereby declare the following to be a full, clear, and exact description of the invention, such as will enable others skilled in the art to which it appertains to make and use the same.

My invention relates to a tool or device for contracting and expanding transversely split demountable rims for automobiles and like vehicle wheels, the primary object of the invention being to provide a tool of this character which is simple and inexpensive of construction, reliable and efficient in action, and by means of which the ends of a rim may be easily and conveniently manipulated, for the purpose of unlocking and contracting the rim for the application or removal of a tire and the subsequent expanding and relocking of the rim to hold the tire in position.

A further object of the invention is to provide a tool of the character described, which is adaptable for use in contracting and expanding transversely divided rims, either of the type in which the ends of the rim are relatively movable radially, with respect thereto, for locking and unlocking, or in which the ends of the rim are locked and unlocked by a relative circumferential or spreading movement of the rim prior to the expansion or contraction thereof.

A still further object of the invention is to provide a tool of the character described, which is applicable to rims of different diameters and widths, which may be conveniently applied and removed, and by means of which a degree of force may be applied in manipulating the ends of the rim, without great effort on the part of the operator.

With these and other objects in view, the invention consists of the novel devices and combinations of devices hereinafter described and defined in the claims.

In the accompanying drawings, which illustrate the invention, like characters indicate like parts throughout the several views.

Referring to the drawings,

Fig. 3 is a perspective view of the tool removed from the wheel rim;

Fig. 4 is a transverse section taken on the line 4—4 of Fig. 1;

Fig. 5 is a view corresponding to Fig. 4, with the exception that the tool has been removed from the wheel rim; and Fig. 6 is a perspective view of the end portions of the wheel rim and the lock therefor.

Figure 1:
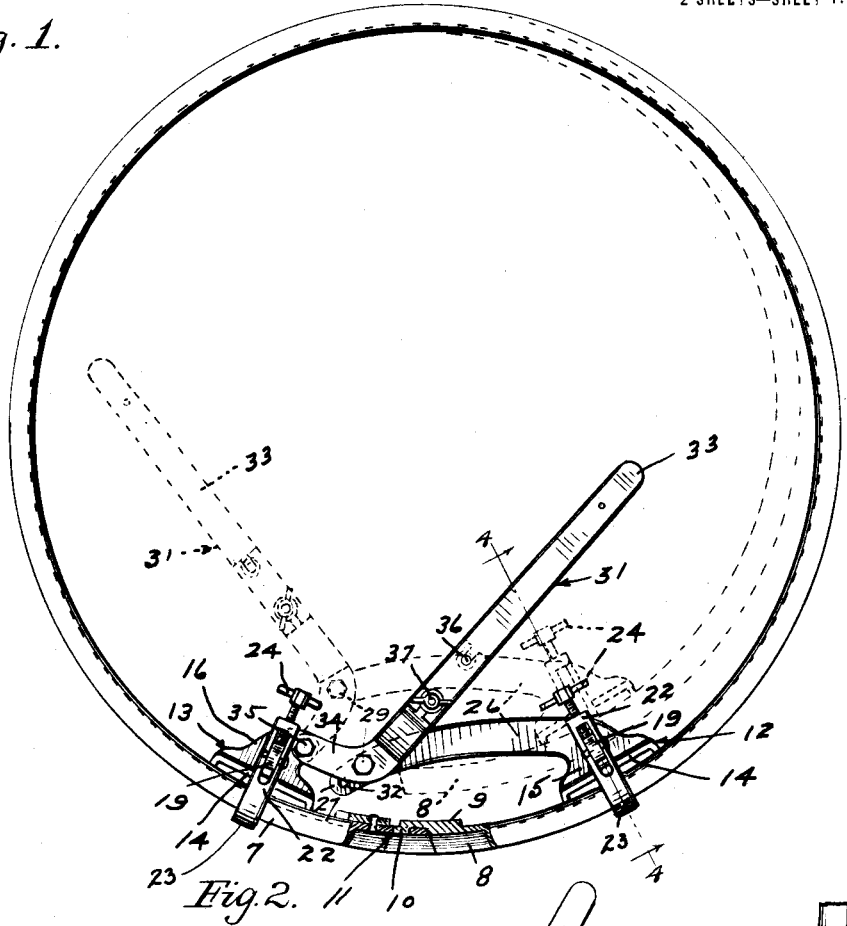
Figure 1 is a view, principally in side elevation, of a demountable wheel rim having the improved tool applied thereto in position for unlocking and contracting the same; some parts being shown in different positions by means of broken lines, and some parts of said rim being shown in circumferential section.

The numerals 7 and 8, respectively, designate the ends of a demountable rim which, for convenience of description, may be termed the relatively fixed and movable ends. As shown, these ends 7 and 8 are separated by a straight transverse split or cleft, the walls of which are arranged to directly abut, when the rim is in expanded condition. The rim end 8 is provided with a locking device in the form of a plate 9, which is designed to overlap the ends 7 and has a projection 10 to engage a keeper opening 11 in the rim end 7, whereby the rim ends are held against relative circumferential and lateral displacement, when the rim is expanded. It will be observed that this construction of the split rim, when locked, requires the rim ends to be displaced in a radial direction for an unlocking action prior to contraction.

The contracting and expanding tool includes a pair of rim-engaging members 12 and 13, each comprising a plate 14 arranged to bear against the inner face of the rim, the respective plates of the rim-engaging members being formed with upstanding lugs 15 and 16. The plates 14 of the rim-engaging members are adapted to be secured in position upon the rim by similar clamping devices 17 and 18, each comprising a two-part clamp, one of the parts of the clamp consisting of a horizontal transverse bar 19, which projects through and is slidably adjustable in an opening in the lug of the rim-engaging member to which it is attached. One end of this bar 19 is formed with a hook 20 to engage one of the edges or clencher flanges of the rim, while the other end thereof is provided with a transverse headed pin 21, or other similar retaining element, to hold it from disconnection and displacement.

The other part of the clamp consists of a body 22, having a slot through which the bar 19 extends and by which it is slidably mounted on said body. This body 22 is provided with a hook 23 to engage the opposite edge or clencher flange of the rim and has a threaded opening intersecting its slot to receive a clamping screw 24, whereby the two parts of the clamp may be fixed in adjusted position with relation to each other. By this means, it will be evident that the clamp is adjustable to fit rims of different widths to be easily and conveniently adjusted in position on the rim and to be readily applied and removed. The retaining pin 21 serves to hold the two parts of the clamp from disengagement, when the tool is not in use, and, in the event that the clamping screw is not in a binding position, as will be readily understood.

To assist in holding the clamps in position, while the tool is being applied to a rim, the members thereof are yieldingly connected by sear springs 25 anchored to the bars 19 by the retaining pins 21 and to the members 22, in the vicinity of their hooks 23, and are under strain to move the hooks 23 toward the hooks 20. It will thus be seen that the springs 25 yieldingly hold the members of the clamps interlocked to the edges of the rim while the operator is adjusting said members prior to the setting of the binding screws 24.

Extending from the lug 15 of the rim-engaging member 12, is a rigid strainer arm 26, which is preferably integral at one end with said lug. This arm is designed to extend circumferentially over and in lapping relation with respect to the split ends 7 and 8 of the rim. The free end of the arm 26 is provided with a projecting portion 27 extending at an oblique angle toward the inner face of the rim, when the tool is applied, and this portion of the strainer arm 26 is provided with an opening 28, which receives a transverse connecting pin or bolt 29 engaging an oblique slot 30 formed in an operating lever 31, whereby said strainer arm is operatively connected with said operating lever. Obviously, the pin or bolt 29 and slot 30 form a shifting fulcrum connection between the rigid strainer arm 26 and operating lever 24, adapting the tool for use in connection with different styles of rims. An opening 32 may also be formed in the end 27 of the arm 26 to receive the pin or bolt 29, under other conditions, as hereinafter fully described.

The operating lever 31 is of the bell-crank type and embodies a long operating arm 33 and a relatively shorter supporting and motion-transmitting arm 34 disposed at an obtuse angle to the arm 33. The slot 30 for the pin or bolt 29 is formed in the arm 34 at a point adjacent to its angle of intersection with the arm 33 and its free end is pivotally connected with the lug 16 of the rim-engaging member 13 by a pin or bolt 35, whereby the lever is pivotally supported. For the sake of convenience, the long operating arm 33 of the lever 31 is made in two parts, whereby the outer section thereof may be detached when the tool is not in use, thus permitting said tool to be stored or packed in a minimum amount of space. As a convenient and simple means for rigidly but detachably connecting the two sections of the arm 33, the inner end portions thereof are overlapped and provided with notches to receive a stud 36 carried by the outer arm section and the thumb-nut-equipped bolt 37 carried by the inner arm section, and by which bolt the two arm sections are frictionally clamped together.

In the use of the tool or device, it will be seen that the rim-engaging members 12 and 13 are applied to the rim ends 7 and 8 on opposite sides of the split or cleft and firmly and securely clamped into position in an obvious manner, the parts being so disposed as to hold the strainer arm 26 extending circumferentially under and in lapping relation to the rim ends. When the parts are so applied for use, the lever 31 is arranged, as shown by full lines in Fig. 1, from which it will be seen that the arm 33 extends at an angle beyond the cleft and under the rim end 8, while the arm 34 extends at an angle toward the cleft from its pivotal support 35.

Figure 2:
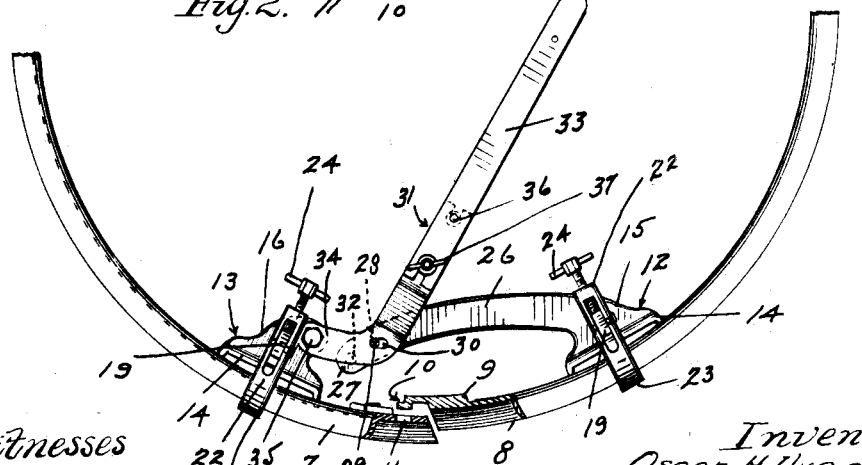
Fig. 2 is a view corresponding to Fig. 1, with the exception that the tool has been moved into a position to unlock the ends of the wheel rim.

The tool is especially adapted for connecting and disconnecting the ends of the members that have locking devices arranged to be brought into and out of action by radial movement of one end of the member in respect to the other. When the tool is properly applied for this purpose, as shown in Fig. 2, and the lever 23 is moved toward the left, the first effect will be to move the free end of the rigid arm 26 toward the axis or center of the rim, thereby positively pulling the right hand end of the rim, (Fig. 2) inward and positively pushing the left hand of the said rim outward so that they will overlap. The continued movement of the said lever in the direction stated will have a decreased offset effect and will impart an increasing movement to the rim ends in a direction circumferentially of the rim. This primary movement of the lever arm 33 will disengage the lock member 10 from the keeper opening 11, and thereby unlock the rim ends.

The continued movement of the lever 31 in the direction noted from the position indicated in Fig. 1 by full lines, to the position indicated in the same figure, by means of broken lines, will result in a circumferential pull upon the rim end 8, whereby the rim will be contracted, as shown by broken lines in Fig. 1, thus allowing a tire to be applied or removed from the rim in a convenient manner. In this condition of the rim, the rim end 8 overlaps the rim end 7 and bears with spring pressure thereon, whereby the rim will be held contracted, without the use of auxiliary holding or fastening means.

In expanding and relocking the rim, the lever 31 is swung from its dotted line position to its full line position in Fig. 1, in which movement a preliminary circumferential movement will be transmitted through the strainer arm 26 to expand the rim and bring the rim ends back to normal position, as shown in Fig. 2, after which a downward movement will impart a radial force to cause the latch member 10 to again enter the keeper opening 11. It will thus be apparent that a combined radial and circumferential motion may be transmitted to the rim end 8, with relation to the rim end 7 for unlocking and contracting and expanding and relocking actions, and, that through the powerful action of the operating lever, the expanding and contracting actions may be effected without the use of material force on the part of the operator.

It will thus be seen that by simply varying the position of the pin 29, within the slot 30, the device may be adapted to give, either a preliminary radial movement and then a contracting movement, or to give a preliminary circumferential spreading movement, then a radial movement and finally a contracting movement, rendering the device adaptable for expanding and contracting rims of the different styles mentioned. By engaging the pin or bolt 29 with the slot 30, the device is rendered adaptable for use on rims of different diameters, the variation in the arrangement of the pivotal connection alternating the arrangement of the plates 14 to accord with the variations in the inner surfaces of the rim ends, due to the change in radius in different diameters of rims.

What I claim is:—

1. A rim contractor and expander comprising rim-engaging members adapted to engage the ends of a transversely divided rim, an arm rigid with one of the rim-engaging members, and an operating lever pivoted to the other rim-engaging member and to the free end of the rigid arm for imparting radial and circumferential movements to the rigid arm with respect to the rim center.

2. A rim contractor and expander comprising rim-engaging members adapted to engage the ends of a transversely divided rim, an arm rigid with one of the rim-engaging members and extending in a direction toward the other thereof, and a bell-crank lever having long and short arms, said short arm being pivotally connected at its free end to the second named rim-engaging member and at its point of junction with said long arm to the free end of the rigid arm.

3. A rim contractor and expander comprising a pair of rim-engaging members, an outturned arm rigid with one of the rim-engaging members and extending toward the other thereof, and a bell-crank lever having a long operating arm and a short motion-transmitting arm, said short arm being pivotally connected at its free end to the second named rim-engaging member and at or adjacent to its point of junction with said long arm to the free end of the rigid arm.

4. A rim contractor and expander comprising a pair of rim-engaging members, an arm rigid with one of the rim-engaging members and extending toward the other thereof, and a lever having a motion-transmitting arm connected to the second named rim-engaging member and slidably and pivotally connected with the free end of the rigid arm.

5. A rim contractor and expander comprising a pair of rim-engaging members, an arm rigid with one of the rim-engaging members and extending toward the other thereof, a bell-crank lever having one of its arms pivoted at its free end to the second named rim-engaging member and having an inclined slot at the junction of its arms, and a pivot on the free end of the rigid arm and extending into said slot.

6. A rim contractor and expander comprising a pair of rim-engaging members adapted for sliding adjustment on the ends of a transversely divided rim, an arm rigid with one of the rim-engaging members and projecting toward the other thereof, a bell-crank lever having one of its arms pivotally connected to the second named rim-engaging member, and a pivotal connection between the lever and the rigid arm adjustable by relative adjusting movements of the rim-engaging members to couple the lever and rigid arm for different adjusting movements of the ends of the rim.

7. A rim contractor and expander comprising a pair of rim-engaging members adapted to be fixed to and relatively adjusted on the ends of a transversely divided rim with relation to the cleft between the same, an arm rigid with one of the rim-engaging members and projecting toward the other thereof, a bell-crank lever having a long operating arm and a short motion-transmitting arm, said short arm being pivotally connected at its free end to the second named rim-engaging member and provided at its opposite end with an inclined slot, and a pivot pin passed through said slot and rigid arm and adjustable in said slot to vary the working action of the lever.

8. A rim contractor and expander comprising rim-engaging members and a lever mechanism connecting said members for operating the ends of a transversely divided rim, said lever mechanism being adjustable to effect either a preliminary relatively radial movement of the ends of the rim and a final circumferential contracting movement, or to first preliminarily force the ends of the rim apart prior to the aforesaid movements.

9. A rim contractor and expander embodying a pair of rim-engaging elements, each consisting of an element to bear against the inner face of a rim, hook-equipped rim-engaging members slidably connected for adjustment transversely of the rim for movement into and out of engagement with the edges of the rim, means for holding said members in adjusted position, and a lever mechanism carried by the rim-engaging members for imparting adjusting movements to the ends of the rim.

10. A rim contractor and expander embodying a pair of rim-engaging devices, each consisting of an element to bear against the inner face of a rim, hook-equipped rim-engaging members slidably connected for adjustment transversely of the rim for movement into and out of engagement with the edges of the rim, yielding means under strain to move one of said members toward the other thereof, means for holding the hook-equipped rim-engaging members in adjusted position, and a lever mechanism carried by the rim-engaging members for imparting adjusting movements to the ends of the rim.

11. A tire-rim contractor, comprising a pair of members adapted to be connected with a tire rim to separate the ends thereof, means operable between said members for imparting relative movement thereto and means for detachably and adjustably connecting each of said members to the tire rim comprising a rigid jaw shaped to hook over one flange of the rim, a laterally adjustable jaw shaped to hook over the other rim flange, and means for varying the length of said adjustable jaw to thereby clamp the member to the rim.

12. A tool for attaching and detaching a demountable split rim, comprising two sections adapted to be clamped to the respective ends of the rim, an operating device on one of the sections, and interengaging means between the sections, whereby a continuous movement of the device in one direction produces first relative tangential movement of the ends of the rim and then relative radial movement and finally relative tangential movement in the opposite direction from the first tangential movement.

In testimony whereof I affix my signature in presence of two witnesses.

OSCAR H. UVAAS.

Witnesses:
O. W. Harrison,
J. A. Johnson.